(12) United States Patent
Erard et al.

(10) Patent No.: US 11,030,697 B2
(45) Date of Patent: Jun. 8, 2021

(54) SECURE DOCUMENT EXCHANGE PORTAL SYSTEM WITH EFFICIENT USER ACCESS

(71) Applicant: Maximus, Inc., Austin, TX (US)

(72) Inventors: Mark E. Erard, Reston, VA (US); Raja Balasubramanian, Austin, TX (US); Viraf Bankwalla, Austin, TX (US); Michael C. Monette, Austin, TX (US); Mohammad A. Sabri, Austin, TX (US); Bruce W. Saunders, Austin, TX (US); Thomas Stockton, Austin, TX (US); Ryan Vaniderstine, Austin, TX (US)

(73) Assignee: Maximus, Inc., Reston, VA (US)

( * ) Notice: Subject to any disclaimer, the term of this patent is extended or adjusted under 35 U.S.C. 154(b) by 813 days.

(21) Appl. No.: 15/430,131

(22) Filed: Feb. 10, 2017

(65) Prior Publication Data

US 2018/0232812 A1    Aug. 16, 2018

(51) Int. Cl.
*G06F 16/35* (2019.01)
*G06Q 40/08* (2012.01)

(52) U.S. Cl.
CPC ........... *G06Q 40/08* (2013.01); *G06F 16/355* (2019.01)

(58) Field of Classification Search
CPC .............................. G06Q 40/08; G06F 16/355
See application file for complete search history.

(56) References Cited

U.S. PATENT DOCUMENTS

| 5,982,891 | A  | 11/1999 | Ginter et al. |
| 6,021,202 | A  | 2/2000  | Anderson et al. |
| 6,507,826 | B1 | 1/2003  | Maners |
| 6,711,253 | B1 | 3/2004  | Prabhaker |
| 6,915,254 | B1 | 7/2005  | Heinze et al. |
| 7,103,562 | B2 | 9/2006  | Kosiba et al. |
| 7,233,938 | B2 | 6/2007  | Carus et al. |
| 7,376,957 | B1 | 5/2008  | Scurlock |
| 7,464,036 | B1 | 12/2008 | Witte et al. |
| 7,587,368 | B2 | 9/2009  | Felsher |
| 7,730,543 | B1 * | 6/2010 | Nath ................... G06F 21/6218 713/171 |
| 7,853,546 | B2 | 12/2010 | Damodharan |
| 7,937,333 | B2 | 5/2011  | Ryan, Jr. et al. |
| 7,974,857 | B1 | 7/2011  | Fischer et al. |
| 7,996,405 | B2 | 8/2011  | Shima et al. |
| 8,086,558 | B2 | 12/2011 | Dewar |
| 8,185,430 | B2 | 5/2012  | Edwards et al. |

(Continued)

FOREIGN PATENT DOCUMENTS

| EP | 2736002 | 5/2014 |
| GB | 2535373 | 8/2016 |

(Continued)

OTHER PUBLICATIONS

NPL01_www.dss.pdf_Archive_org_4_18_12 Department of Children and Family Services State of Louisiana.

(Continued)

*Primary Examiner* — Taelor Kim

(74) *Attorney, Agent, or Firm* — Kowert, Hood, Munyon, Rankin & Goetzel, P.C.; Gareth M. Sampson

(57) ABSTRACT

A method of implementing a secure exchange portal system for independent medical review, and classification tools and case-level physician review tools for use in such reviews, are disclosed.

20 Claims, 14 Drawing Sheets

(56) References Cited

U.S. PATENT DOCUMENTS

| | | |
|---|---|---|
| 8,214,238 B1 | 7/2012 | Fairfield et al. |
| 8,300,797 B1 | 10/2012 | Benesh et al. |
| 8,355,926 B1 | 1/2013 | Hinz et al. |
| 8,401,886 B2 | 3/2013 | Khetarpal et al. |
| 8,457,544 B2 | 6/2013 | German et al. |
| 8,488,769 B1 | 7/2013 | Noble, Jr. et al. |
| 8,539,493 B1 | 9/2013 | Robertson et al. |
| 8,645,175 B1 | 2/2014 | Arbogast |
| 8,694,351 B2 | 4/2014 | Stevens et al. |
| 8,711,732 B2 | 4/2014 | Johnson |
| 8,713,007 B1 | 4/2014 | Korolev et al. |
| 8,811,597 B1 | 8/2014 | Hackbarth et al. |
| 8,938,063 B1 | 1/2015 | Hackbarth et al. |
| 9,589,244 B2 | 3/2017 | Riefel |
| 9,614,961 B2 | 4/2017 | Riefel |
| 2001/0047283 A1 | 11/2001 | Melick |
| 2002/0019741 A1 | 2/2002 | Heston |
| 2002/0102993 A1 | 8/2002 | Hendrey et al. |
| 2002/0169718 A1 | 11/2002 | Alsofrom |
| 2003/0110340 A1 | 6/2003 | Butler et al. |
| 2004/0064330 A1 | 4/2004 | Keelan |
| 2004/0219493 A1 | 11/2004 | Phillips |
| 2004/0220895 A1 | 11/2004 | Carus et al. |
| 2005/0065837 A1 | 3/2005 | Kosiba et al. |
| 2005/0086075 A1 | 4/2005 | Kaehler et al. |
| 2005/0129212 A1 | 6/2005 | Parker |
| 2005/0135600 A1 | 6/2005 | Whitman, Jr. |
| 2005/0135601 A1 | 6/2005 | Whitman, Jr. |
| 2006/0015944 A1 | 1/2006 | Fields |
| 2006/0129617 A1 | 6/2006 | Nagai et al. |
| 2006/0143228 A1 | 6/2006 | Odio-Paez et al. |
| 2006/0161464 A1 | 7/2006 | Green |
| 2006/0179063 A1 | 8/2006 | Rose et al. |
| 2006/0265268 A1 | 11/2006 | Hyder et al. |
| 2007/0111176 A1 | 5/2007 | Brown |
| 2007/0143019 A1 | 6/2007 | Feyen et al. |
| 2007/0198322 A1 | 8/2007 | Boume et al. |
| 2007/0226340 A1 | 9/2007 | Hastings et al. |
| 2007/0288759 A1 | 12/2007 | Wood et al. |
| 2008/0077450 A1 | 3/2008 | Klippel |
| 2008/0103828 A1 | 5/2008 | Squilla et al. |
| 2008/0133513 A1 | 6/2008 | Linde |
| 2008/0172286 A1 | 7/2008 | Ramanujan et al. |
| 2009/0113427 A1 | 4/2009 | Brady et al. |
| 2009/0150389 A1 | 6/2009 | Knorr |
| 2009/0190760 A1 | 7/2009 | Bojinov et al. |
| 2009/0307052 A1 | 12/2009 | Mankani et al. |
| 2010/0076835 A1 | 3/2010 | Silverman |
| 2010/0211516 A1 | 8/2010 | Andrekovich et al. |
| 2010/0228563 A1 | 9/2010 | Walker |
| 2010/0306204 A1 | 12/2010 | Chitiveli et al. |
| 2011/0082777 A1 | 4/2011 | Chess |
| 2011/0112879 A1 | 5/2011 | Fama |
| 2011/0117534 A1 | 5/2011 | Berger et al. |
| 2011/0119197 A1 | 5/2011 | Turchin |
| 2011/0161933 A1 | 6/2011 | Hudson |
| 2011/0166890 A1 | 7/2011 | Menschik et al. |
| 2011/0191115 A1 | 8/2011 | Zalam |
| 2011/0218885 A1 | 9/2011 | Manski |
| 2011/0258132 A1 | 10/2011 | Andrekovich et al. |
| 2011/0295623 A1 | 12/2011 | Behringer et al. |
| 2012/0014519 A1 | 1/2012 | Kosiba et al. |
| 2012/0022906 A1 | 1/2012 | Snyder et al. |
| 2012/0051536 A1 | 3/2012 | Chishti et al. |
| 2012/0077173 A1 | 3/2012 | Crawford et al. |
| 2012/0078924 A1 | 3/2012 | Woodings et al. |
| 2012/0087486 A1 | 4/2012 | Guerrero et al. |
| 2012/0158641 A1 | 6/2012 | Klinger et al. |
| 2013/0080239 A1 | 3/2013 | Okerlund |
| 2013/0110758 A1 | 5/2013 | Jung et al. |
| 2013/0132583 A1 | 5/2013 | McCord |
| 2013/0159017 A1 | 6/2013 | Burkholder |
| 2013/0185087 A1 | 7/2013 | Merkin |
| 2013/0191185 A1 | 7/2013 | Galvin |
| 2013/0198227 A1 | 8/2013 | Fradkin et al. |
| 2013/0204757 A1 | 8/2013 | Willard |
| 2013/0204874 A1 | 8/2013 | Frey |
| 2013/0211856 A1 | 8/2013 | Pribyl et al. |
| 2013/0247005 A1 | 9/2013 | Hirsch et al. |
| 2013/0311994 A1 | 11/2013 | Jung et al. |
| 2013/0346310 A1 | 12/2013 | Burger et al. |
| 2014/0058927 A1 | 2/2014 | Schwarzkopf |
| 2014/0074834 A1 | 3/2014 | Pike |
| 2014/0095537 A1 | 4/2014 | Park et al. |
| 2014/0136240 A1 | 5/2014 | Mahoney et al. |
| 2014/0156686 A1 | 6/2014 | Woodings et al. |
| 2014/0211931 A1 | 7/2014 | Wendt |
| 2014/0211932 A1 | 7/2014 | Zhao et al. |
| 2014/0211933 A1 | 7/2014 | Vymenets et al. |
| 2014/0219436 A1 | 8/2014 | Kosiba et al. |
| 2014/0278575 A1 | 9/2014 | Anton et al. |
| 2014/0289147 A1 | 9/2014 | Haff et al. |
| 2014/0304246 A1 | 10/2014 | Helmich et al. |
| 2014/0362984 A1 | 12/2014 | Danson et al. |
| 2014/0365440 A1 | 12/2014 | Steiner |
| 2015/0019451 A1 | 1/2015 | Schnack et al. |
| 2015/0074409 A1 | 3/2015 | Reid |
| 2015/0092936 A1 | 4/2015 | Riefel |
| 2015/0095072 A1 | 4/2015 | Riefel |
| 2015/0131793 A1 | 5/2015 | Riefel |
| 2015/0154418 A1 | 6/2015 | Redberg |
| 2015/0178458 A1 | 6/2015 | Pellinat et al. |
| 2015/0356250 A1 | 12/2015 | Polimeni |
| 2016/0012561 A1 | 1/2016 | Lappenbusch |
| 2016/0044040 A1 | 2/2016 | Caffary, Jr. |
| 2016/0048758 A1 | 2/2016 | Campbell |
| 2016/0239931 A1 | 8/2016 | Sabri et al. |
| 2017/0041296 A1* | 2/2017 | Ford ............... G06F 16/951 |
| 2018/0232487 A1 | 8/2018 | Erard et al. |
| 2018/0232493 A1 | 8/2018 | Erard et al. |
| 2018/0232812 A1 | 8/2018 | Erard et al. |

FOREIGN PATENT DOCUMENTS

| | | |
|---|---|---|
| WO | 2015/048789 | 4/2015 |
| WO | 2015/048790 | 4/2015 |
| WO | 2015048787 | 4/2015 |
| WO | 2016/123542 | 8/2016 |

OTHER PUBLICATIONS

NPL02_WebTA, https://web.archive.org/web/20120925014615/http://www.treasury.gov/services/gov-shared-services/H R- Connect/Pages/webTA.aspx, Wayback Machine Sep. 25, 2012.

NPL03_UI Reemployment Services, https://web.archive.org/web/20100601220034/https://dwd. wisconsin .gov/observice/Reemployment. htm, Wayback Machine Jun. 1, 2010.

NPL04_Proving active job search for unemployment benefits, Posted Aug. 23, 2010 ("JobSearch").

NPL12_A news release for DDtrac by Developing Minds Software, http://news.developingmindssoftware.com/?p=124, dated Jun. 8, 2008.

NPL13_A User's Guide for ddtrac by Developing Minds Software, https://www.ddtrac.com/demo/wiki.asp?page=Progress+Chart.

NPL14_A paper on Rapid Response Request by the Southeast Comprehensive Center, Table 1, http://secc.sedl.org/prc/rr/secc_IT_00080.pdf, Mar. 13, 2009.

NPL15_Release notes for the NYC Special Education Student Information System ("SESIS"), SESIS Release Notes, May 6, 2013, pp. 3-5.

NPL16_A release for the Illinois Medicaid Redetermination Project (IMRP) by Illinois Department of Human Services dated Feb. 6, 2014 ("IMRP Release"), IMPR Release, http://www.dhs.state.il.us/page.aspx?item=68456, pp. 1-2.

NPL17_A Policy Memo on the Illinois Medicaid Redetermination Project by the Illinois Department of Healthcare and =family Services ("IMRP Policy Memo"), IMPR Policy Memo dated Feb. 13, 2013, https://www.dhs.state.il.us/page.aspx?item=62971, pp. 1-4.

NPL18_A brochure for MedicareMVP from eSolutions, Inc., MedicareMVP brochure, www.esolutionsinc.com/medicare-eligibility-verification.

(56) References Cited

OTHER PUBLICATIONS

NPL19_A paper entitled Integrated Eligibility on a website of the State of Ohio, Integrated Eligibility, http://www.healthtransformation.ohio.gov/LinkClick.aspx?fileticket=pWekJiFe9O4%3d&tabid=117, pp. 2-5.

NPL20_"TechSource National Acquires IMEBASE, The Industry's Premier Cloud-Based IME Software" http://www.imebase.com/news/techsource-national-acquires-imebase-the-industrys-premier-cloud-based-ime-software/. Jul. 15, 2015,.

NPL21_Humana webpage, Medical records review for healthcare providers, https://www.humana.com/provider/support/clinical/medical-records. Dec. 1, 2016.

NPL22_Article, VA blog, "New tool launches to improve the benefits claim appeals process at the VA", http://www.blogsva.gov/VAntage/27107/new-tool-launches-improve-benefits-claim-appeals-process-va/ Dec. 1, 2016.

NPL23_Savkov, A. et al. "Annotating patient clinical records with syntactic chunks and named entities: the Harvey Corpus". Lang Resources & Evaluation 50:523-548. Published online: Jan. 11, 2016.

NPL24_Practice Fusion EHR Software "Save Time with Smart Charting". https://www.practicefusion.com/medical-chart-ehr/. Dec. 1, 2016.

Co-Pending U.S. Appl. No. 15/430,131 entitled, "Secure Document Exchange Portal System With Efficient User Access" to Erard et al. filed Feb. 10, 2017.

Co-Pending U.S. Appl. No. 15/430,136 entitled, "Document Classification Tool for Large Electronic Files" to Erard et al. filed Feb. 10, 2017.

Co-Pending U.S. Appl. No. 15/430,142 entitled, "Case-Level Review Tool for Physicians" to Erard et al. filed Feb. 10, 2017.

Non-Final Office Action for U.S. Appl. No. 13/845,968 dated Aug. 3, 2015.

Final Office Action for U.S. Appl. No. 13/845,968 dated May 31, 2016.

Non-Final Office Action for U.S. Appl. No. 13/845,968 dated Feb. 17, 2017.

Non-Final Office Action for U.S. Appl. No. 14/184,459 dated Apr. 24, 2014.

Non-Final Office Action for U.S. Appl. No. 14/184,459 dated Aug. 25, 2014.

Final Office Action for U.S. Appl. No. 14/184,459 dated Jan. 23, 2015.

Non-Final Office Action for U.S. Appl. No. 14/184,459 dated Sep. 8, 2015.

Final Office Action for U.S. Appl. No. 14/184,459 dated Mar. 16, 2016.

Non-Final Office Action for U.S. Appl. No. 14/184,459 dated Jan. 31, 2017.

Non-Final Office Action for U.S. Appl. No. 14/201,211 dated Jun. 6, 2014.

Non-Final Office Action for U.S. Appl. No. 14/201,211 dated Oct. 21, 2014.

Final Office Action for U.S. Appl. No. 14/201,211, Notification Date: May 20, 2015.

Non-Final Office Action for U.S. Appl. No. 14/201,211, Notification Date: Dec. 18, 2015.

Final Office Action for U.S. Appl. No. 14/201,211, Notification Date: May 6, 2016.

Non-Final Office Action for U.S. Appl. No. 14/201,211, Notification Date: Sep. 21, 2016.

Final Office Action for U.S. Appl. No. 14/201,211, Notification Date: Feb. 66, 2017.

Non-Final Office Action for U.S. Appl. No. 14/502,807, Notification Date: Mar. 25, 2015.

Final Office Action for U.S. Appl. No. 14/502,807, Notification Date: Oct. 30, 2015.

Non-Final Office Action for U.S. Appl. No. 14/502,807, Notification Date: Mar. 11, 2016.

Notice of Allowance for U.S. Appl. No. 14/502,807, Notification Date: Nov. 18, 2016.

NPL05_International 19 pp.. Search Report and Written Opinion, Application No. PCT/US14/58425, dated Feb. 24, 2015,.

NPL06_International Preliminary Report on Patentability, Application No. PCT/US14/58425, dated Sep. 24, 2015, 12 pages.

NPL07_International Search Report and Written Opinion, Application No. PCT/US14/58431, dated Aug. 27, 2015, 11 pages.

NPL08_International Preliminary Report on Patentability, Application No. PCT/US14/58431, dated Feb. 16, 2016, 5 pages.

Non-Final Office Action for U.S. Appl. No. 14/502,828, Notification Date: Oct. 1, 2015.

Final Office Action for U.S. Appl. No. 14/502,828, Notification Date: Jun. 2, 2016.

Notice of Allowance for U.S. Appl. No. 14/502,828, Notification Date: Oct. 24, 2016.

NPL09_International Search Report and Written Opinion, Application No. PCT/US14/58432, dated Jun. 18, 2015, 7 pages.

NPL10_International Preliminary Report on Patentability, Application No. PCT/US14/58432, dated Nov. 12, 2015, 7 pages.

NPL11_International Search Report and Written Opinion, Application No. PCT/US16/015758, dated Jun. 3, 2016, 14 pages.

Examiner's Answer to Appeal Brief for U.S. Appl. No. 14/184,459 dated Aug. 10, 2017.

Non-Final Office Action for U.S. Appl. No. 14/502,783, Notification Date: Dec. 20, 2018.

Final Office Action for U.S. Appl. No. 15/011,032, Notification Date: Oct. 19, 2018.

Advisory Action for U.S. Appl. No. 15/011,032, Notification Date: Nov. 19, 2018.

Non-Final Office Action for U.S. Appl. No. 15/011,032, Notification Date: Jan. 11, 2019.

Non-Final Office Action for U.S. Appl. No. 15/430,136, Notification Date: Nov. 15, 2018.

NPL25_Apply Process, https://web_archive.org/web/20130309192515/http://hrisguide_unc.edu/epa-rw/lessons/Department_Quick_Apply_Process.html, Wayback Machine Mar. 9, 2013.

Non-Final Office Action for U.S. Appl. No. 14/201,211, Notification Date: Jun. 23, 2017.

Final Office Action for U.S. Appl. No. 14/201,211, Notification Date: Jan. 29, 2018.

Advisory Action for U.S. Appl. No. 14/201,211, Notification Date: Apr. 11, 2018.

Non-Final Office Action for U.S. Appl. No. 14/502,783, Notification Date: Oct. 6, 2017.

Non-Final Office Action for U.S. Appl. No. 14/502,783, Notification Date: May 16, 2018.

Non-Final Office Action for U.S. Appl. No. 15/011,032, Notification Date: Jul. 20, 2018.

NPL26_International Search Report and Written Opinion, Application No. PCT/US18/17433, dated Apr. 24, 2018, 15 pages.

Final Office Action for U.S. Appl. No. 15/430,136, Notification Date: May 31, 2019.

Final Office Action for U.S. Appl. No. 15/430,142, Notification Date: Jun. 3, 2019.

Advisory Action for U.S. Appl. No. 14/184,459 dated May 12, 2015.

Advisory Action for U.S. Appl. No. 14/201,211, Notification Date: May 26, 2017.

Notice of Allowance for U.S. Appl. No. 14/502,783, Notification Date: Jun. 12, 2019.

Non-Final Office Action for U.S. Appl. No. 15/011,032, Notification Date: Jan. 8, 2020.

Advisory Action for U.S. Appl. No. 15/011,032, Notification Date: Sep. 12, 2019.

Advisory Action for U.S. Appl. No. 15/430,136, Notification Date: Sep. 10, 2019.

Non-Final Office Action for U.S. Appl. No. 15/430,136, Notification Date: Feb. 13, 2020.

Final Office Action for U.S. Appl. No. 15/430,142, Notification Date: Dec. 20, 2019.

Advisory Action for U.S. Appl. No. 15/430,142, Notification Date: Feb. 28, 2020.

(56) References Cited

OTHER PUBLICATIONS

NYC HRA Document Upload; NYC Human Resource Administration, Health and Fitness; Apr. 11, 2017; https://play.google.com/store/apps/details?id=gov.nyc.hra.DocUploads&hl=en.
Apptricity; Capturing Expense Receipts on Your Mobile with OCR Technology—Easy as 1 . . . 2 . . . 3; 2016.
Find it, Fix It—Service Request Mobile App, Customer Service Bureau, Finance & Administrative Services Department; https://www.seattle.gov/customer-service-bureau/find-it-fix-it-mobile-app.
Electronic IRS Reporting; http://www.proautomation.com/.
Final Office Action for U.S. Appl. No. 15/011,032, Notification Date: Aug. 2, 2019.

* cited by examiner

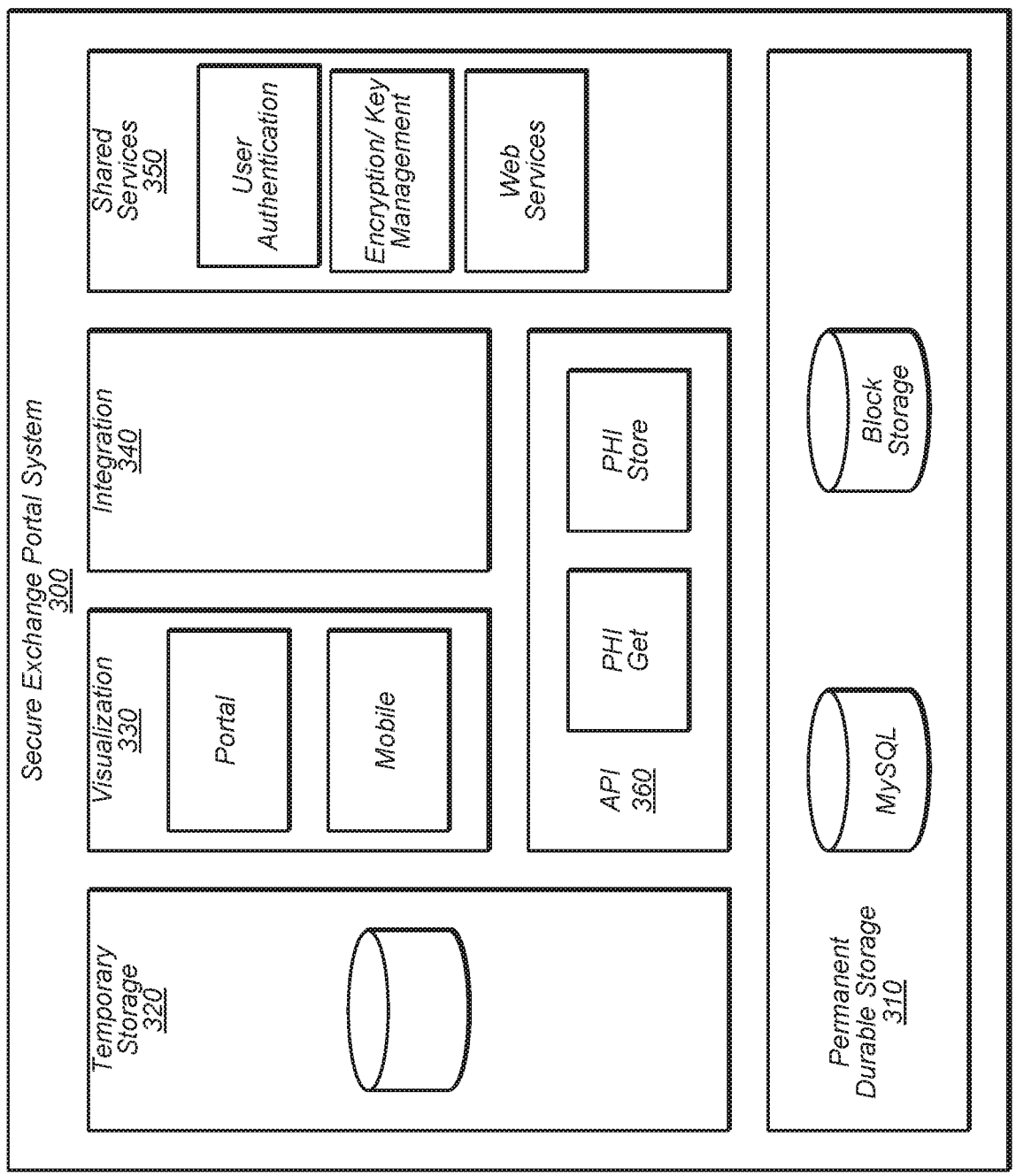

| Home Cases Documents Administration | Logout |
|---|---|

IMR Document Exchange Portal

*Independent Medical Review (IMR) Portal provides case participants the ability to upload and view appeal related documents, and view case details.*

▦ Request for information   ⌕ Case Search

See a list of cases that need attention or require documentation. You can then review these cases and upload documents as needed.

You can search the list of cases you have access to. Pick a case from the list to see details, activities and view / upload documents.

🗁 Documents   ▦ Invoicing

You can upload multiple documents as a batch to different cases based on a prescribed naming convention.

See monthly invoice summaries by IMR categories. You can also pay any outstanding balances you have.

[ Enter ]

FIG. 4

| Home | Cases | Documents | Administration | | | | Logout |

Documents

ⓘ You can upload documents in batch to multiple cases if the document names conform to a prescribed naming convention. The document name must start with the case number. You can select one or more files or directories and submit. The system will then provide you with confirmation if it is able to associate each document with the related case. Note that you can also upload the documents directly into a case under the Cases screen.

◉ Upload
Documents Uploaded by You →

| Name | View | Type | DCN | Case Number | Creation Date ▼ | Size | ⋮ |
|---|---|---|---|---|---|---|---|
| noarfi | ☐ | Medical Records | 900003021 | CM16-10000007 | 10/03/2016 11:43:54... | 6.7 KB | |

| « | ‹ | 1 | › | » | 10 ⬥ items per page | | 1 – 1 of 1 items |

FIG. 10

Bookmarks | Notes

Document Links
4000 [Page Total: 22]
4002 [Page Total: 16]
4014 [Page Total: 78]

Bookmark Links By Type ■ By page
- IMR Application
  - September 9, 2015
    - DCN 4000
      - Page:18
    - 2015/09/10
    - DCN 4014
      - Page: 18
- Progress Notes
  - 2016/09/05
    - DCN 4014
      - Page: 56
      - Page: 67

*Progress Report*

*Patient Name:*
*Date of Service:*

SECURE DOCUMENT EXCHANGE PORTAL SYSTEM WITH EFFICIENT USER ACCESS

BACKGROUND

Field

The present invention relates to the field of services and systems that are used to administer and resolve claims. Embodiments of the invention relate to automation of secure exchange of electronic documents over a network related to independent medical review of worker's compensation claims.

Description of the Related Art

Government and business entities that are involved in administering and resolving claims currently need to gather, sort, and/or identify large amounts of data from a variety of different sources. Once all of the necessary data is acquired it must be made available to a variety of different entities and persons with various different interests and goals. Sometimes the goals of different entities requiring access to the data are in opposition to one another. At least some of the data may be confidential and/or privileged and as such only certain groups may be allowed access to certain portions of the data.

One such example of administering and resolving claims includes independent medical review of worker's compensation claims in order to provide claims determinations for health insurance payers, workers compensation insurance payers or disability insurance payers. An Independent Medical Review (IMR) process is one in which medical doctors, relying on evidence-based treatment guidelines, have replaced judges as the first level arbiters in resolving disputes over the necessity of recommended medical services. These medical doctors are contracted by an independent review organization, to provide objective, unbiased determinations on what the root cause of the treatment was, whether there is medical necessity, if there was a sentinel event, what was the reason for it, etc.

The IMR process is one which requires the review of numerous different files from different agencies (e.g., hospitals, doctors, insurance agencies, government agencies, police departments, fire departments, emergency services, attorneys, etc.) by numerous different groups (e.g., doctors, attorneys, insurance agents, etc.). These files and/or reports for even just a single case can number in the thousands of pages of documents.

As such, electronic files of such documents can be very large (several hundred pages) sometimes taking a long time to download. Physicians spend significant time searching these large documents for just a handful of useful forms. Attorneys and injured workers may resubmit the same documents since they are unsure what information was provided by the claims administrators. These duplicate submissions results in duplicate work—quite often performed by high-cost physicians.

Also, in files compiled from scanning documents from various sources at various times, documents in the file are very likely to be presented unordered, making it difficult to locate the relevant recent few documents that a physician needs to begin the review. In addition, many documents received in the system are scanned images of paper forms. The images cannot support text searches for key terms like a specific drug or medical condition.

SUMMARY

Systems and methods of providing secure exchange of electronic documents over a network related to independent medical review of worker's compensation claims, including a secure document exchange portal. Document classification tools and case-level physician review tools, which can be used in conjunction with a secure document exchange portal, are also disclosed.

In an embodiment, a secure exchange portal system for medical review includes a receiving system. The receiving system first authenticates and then authorizes the user to submit information. The system offers several alternative methods to provide files including web form uploads and web service based submissions. Regardless of which method is employed, the receiving system divides the incoming documents into individual smaller chunks, encrypts each of the chunks, stores them and creates metadata. By subdividing documents into smaller components, the secure exchange portal system can be used by stakeholders to efficiently access select portions of documents of the case, without having to download or access entire document files. The system controls access to each document depending on the authorizations of the user.

In an embodiment, an automated document classification system for files under medical review includes a classification system implemented on one or more computer systems. A classification mechanism uses an ensemble of classifiers to identify specific information in files (e.g., a request for authorization, a utilization review determination, or a physician's progress report).

In an embodiment, a physician's case-level review tool includes a search mechanism and leverages meta-data from the automated document classification system. The physician search tool provides one or more files having scanned medical records that are associated with a case under review. The file(s) include information classified by the classification mechanism as a pre-defined information type (e.g., a request for authorization, a utilization review determination, or a physician's progress report). A selection of one or more elements of classified information is received from a physician user. One or more search terms are received from the physician user. The search mechanism performs a search based on the search terms. At least a portion of at least one of the elements of classified information is displayed to the physician user based on the search.

In some embodiments, a method of secure exchange of information for medical review includes receiving a data stream from at least a first source, wherein the data stream is associated with an independent medical review. In some embodiments, the method may include dividing the received data stream into a plurality of chunks. The method may include encrypting the plurality of chunks.

In certain embodiments, a method of managing a secure exchange portal system includes creating metadata for each of the stored documents. The metadata may include a block size and an initialization vector. The method may include using metadata to restrict access to some documents in a case to a first group of users. In some embodiments, the document metadata may also be used to restrict access to some case documents to a second set of users. In some embodiments, documents within a case may be restricted from users in both groups, accessible by both groups or accessible by members of one group and restricted to members of the other.

In some embodiments, the first source comprises at least one paper document converted into an electronic file format. In some embodiments, the metadata comprises coded medical identifiers and/or an encryption key.

In some embodiments, the method includes administering claims for a worker's compensation claim using the plurality of chunks. The method may include resolving claims for a worker's compensation claim using the plurality of chunks.

In some embodiments, at least one of the plurality of chunks comprises multiple scanned documents. The method may include converting the data stream into a searchable format using character recognition. The method may include compressing the plurality of chunks.

In some embodiments, the method includes providing a first access portal for a first group and a second access portal for a second group, wherein the first group and the second group are different.

In some embodiments, users from multiple groups may be able to access the system through the same portal. In such a system, individuals of each group would have access afforded to them appropriate to the group in which they reside.

BRIEF DESCRIPTION OF THE DRAWINGS

FIG. 3 is a block diagram of one embodiment of a secure exchange portal system.

FIG. 4 illustrates a display of a home page for a user of a secure document exchange portal.

FIG. 10 illustrates a case document management display for a physician search tool according to one embodiment.

FIG. 11 illustrates a display of physician search tool with a Bookmarks tab selected and bookmark links arranged by type.

FIG. 12 illustrates a display of a physician search tool with a Bookmarks tab selected and bookmark links arranged by page.

FIG. 14 illustrates a display of a physician search tool with line-by-line search results shown next to a document classified by the system as a Progress Note.

Figure 1:
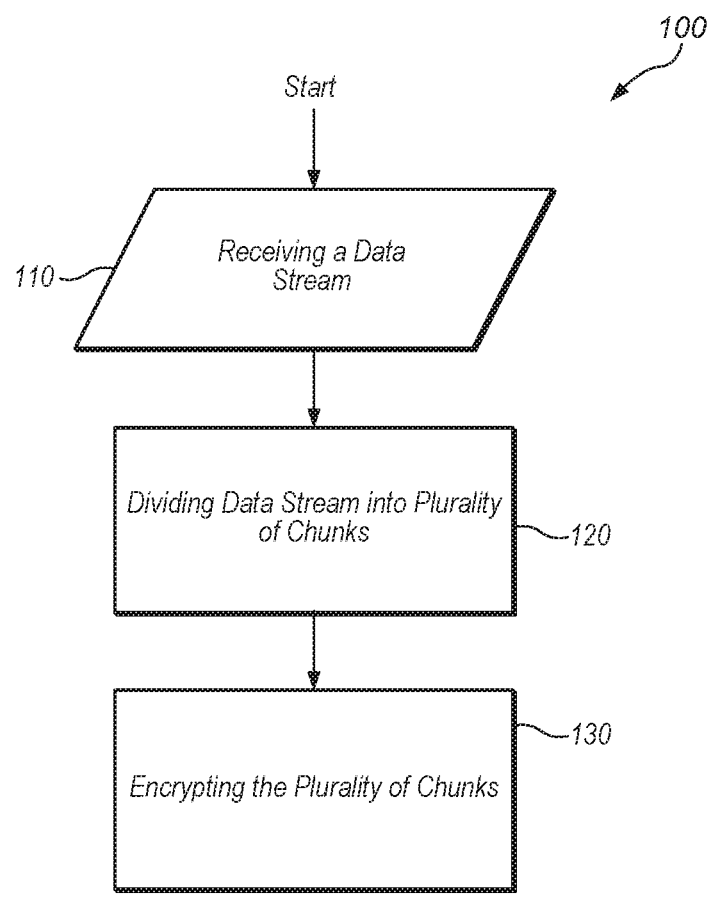
FIG. 1 is a flowchart illustrating a method of managing a secure exchange portal system for independent medical review.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning "having a feature that" performs the task or tasks during operation. As such, the component can be configured to perform the task even when the component is not currently on.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. Regarding the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for describing embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION OF ILLUSTRATIVE EMBODIMENTS

Definitions

Unless defined otherwise, all technical and scientific terms used herein have the same meaning as commonly understood by one of ordinary skill in the art.

The term "chunk" as used herein generally refers to a portion of a data stream or file which is sent to a processor or one of the parts of a computer for processing. An example of a chunk may be a portion of a file including a set of scanned documents. The documents may be associated with a case that is under medical review.

"Information" may be in the form of content contained within, or derived from, a file or stream of data. An element or piece of "information" may be a particular scanned document or an element within a scanned document, such as a physician's progress report. "Information" may, in some cases, be in the form of other discrete items appearing within a document or file, such as an attorney letter, or a reproduction of an x-ray image. As used herein, "classified information" includes information that has been classified (e.g., into one or more categories). Information may be classified, for example, using automatic classification mechanisms as described herein.

The term "back-end system" as used herein generally refers to computer systems deal with databases and data processing components, so the purpose of the back-end system is to respond to front-end system requests and operations.

EMBODIMENTS

1. Secure Document Exchange Portal System with Efficient User Access.

Figure 2:
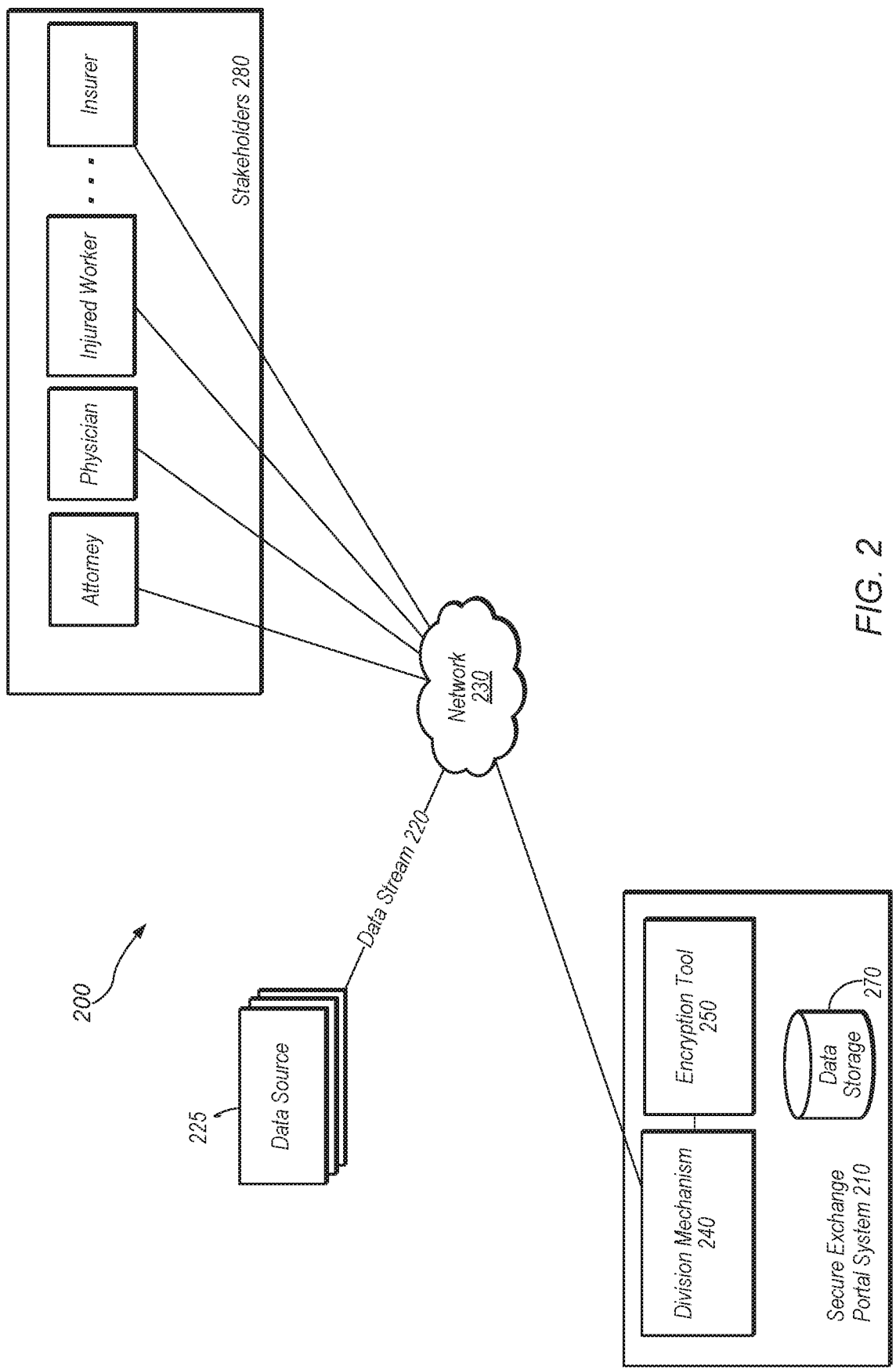
FIG. 2 illustrates one embodiment of a system for managing a secure exchange portal system for independent medical review.

A method may include managing a secure exchange portal system for independent medical review. FIGS. 1-2 illustrate one embodiment of a flowchart illustrating a method (100) and system 200 of managing a secure exchange portal system 210 for independent medical review. The method may include receiving (110) a data stream 220 from one or more sources 225. In some embodiments, the data stream is associated with an independent medical review of a medical claim (e.g., a worker's compensation claim). A document exchange portal system 210 may provide secure exchange of electronic information over a network 230. The system may be used to provide for exposure and consumption of information for administering and resolving claims, such as independent medical review of worker's compensation claims.

The system includes a mechanism that stores, manages and enables review of very large files and facilitates secure access to specific portions or aspects of case information by interested stakeholders. In some embodiments, the method may include dividing (120) the received data stream into a plurality of chunks using a division mechanism 240. In some embodiments, the method may include encrypting (130) the plurality of chunks using an encryption tool 250. In some embodiments, the first source may each include at least one or more paper documents converted into an electronic file format. In some embodiments, at least one of the plurality of chunks comprises multiple scanned pages. The method may include converting the data stream into a searchable format using character recognition. The method may include compressing the individual chunks.

The system may administer and control the rights/access that various stakeholders 280 (e.g., physicians, IMR review staff, injured workers, insurer personnel, and attorneys) have to contribute (e.g., upload) and/or access particular information (e.g., medical records). For example, a reviewing physician may have the right to access only the medical records for those claims that the physician is assigned to review. Individuals and/or groups may be provided with means for accessing encrypted individual chunks. In some embodiments, the method may include establishing a user as a representative of an authorized party thereby providing the user with a defined set of capabilities with regard to particular information (e.g., medical records and access thereof).

FIG. 3 is a block diagram of one embodiment of a secure exchange portal system. Secure exchange system 300 includes permanent durable storage 310, temporary storage 320, visualization elements 330, integration elements 340, shared services 350, and application program interface 360.

In one embodiment, an integration server manages and controls the exchange of information between one or more back-end servers and a front-end system. The integration server may ensure that any stakeholder access to information on the back-end server is accomplished by secure exchange. In one embodiment, integration services provide a secure gateway to case and document data. The integration server performs message routing and transformation, protocol translation, and request queuing and retries between the different backend services in a secure way. The integration server may provide notification to the back-end system when a new case is received, when documents are received in a mailroom, and when documents are uploaded through portal.

In certain embodiments, metadata is stored through a mechanism that uses CNRI's Digital Object Architecture. A digital object database serves as an information store in response to information retrieved and sent from permanent storage to users. The DOA-based mechanism stores metadata (which may include information about the cases and documents). The mechanism helps facilitate who has what rights to those cases and documents. Using the system, a large number and volume of external users can be supported in separate realms. Each stakeholder may invite other users to receive access according to parameters set by the inviting stakeholder and the system. For example, a claimant may invite the claimant's attorney to allow the attorney to upload and/or access documents.

A set of web servers are responsible for serving up portal pages and access the web services behind those pages.

Secure exchange system 300 may include document upload and retrieval tools. Document upload tools allow both individual and batches of documents to be transferred to the portal and automatically assigned to cases as needed. In some embodiments, a Retrieval tool and PDF viewer enables a user to retrieve the content required to render/view a single page vs. retrieving the entire file, thereby saving download time. The retrieval tool may be configured to restrict actions available to a user—for example, printing of the PDF file may be disabled, as can the ability to save the document to local storage.

Data is preferably encrypted at rest and in transit. Access control may be bound to each object (medical record). Encryption keys may be stored securely using a key management tool. Multiple sources of encryption keys may be used and stored independently as metadata such that an unauthorized user is unable to assemble sufficient keys in order to decrypt the data. Data services are provided such that documents cannot be decrypted without first establishing permissions via authentication and authorization.

In some embodiments, the system retrieves a list of documents for a specified case. The document list includes key metadata including document unique handle id, created date, last updated date, document source, and document type. A specific document may be retrieved based on its unique handle id. A list of active cases for the Claims Administrator may be retrieved. Case metadata may include case handle id, current case status, case status date, date case last updated.

In some embodiments, a secure document exchange system includes an archiving mechanism.

In some embodiments, the system may handle authentication of each user depending on the role of the user. The method may include using a first set of metadata to restrict access to at least one of the documents to a first group of users and a second set of metadata to restrict access to at least one of the documents to a second group of users. The first group of users may be different from the second group of users. The first group of users may access a specific portion of the at least one of the documents using the metadata.

In some embodiments, security/access may be handled by an access management tool. In some embodiments, an open source tool may be used as the access management tool. The access management tool may include one or more features. In some embodiments, an access management tool may allow for single-sign on. Single-sign on may allow for authentication and signing in to multiple different platforms with a single login/logout. In some embodiments, an access management tool may allow for login via social networks via configuring the Identity Provider through the admin console. In some embodiments, an access management tool may allow for connecting through Active Directory servers. In some embodiments, an access management tool may allow for central management of all of the accessibility features. In some embodiments, an access management tool may allow for enabling and disabling various features (e.g., configuring identity brokering and user federation).

In some embodiments, the method includes administering claims for a worker's compensation claim using the plurality of chunks. The method may include resolving claims for a worker's compensation claim using the plurality of chunks. In some embodiments, the metadata associated with chunks and/or documents may include coded medical identifiers. Coded medical identifiers may include, for example, industry standardized medical labels or identifiers.

The system may provide access to information in the documents to each of the many stakeholders who may be involved in a particular case (e.g., an appeal of a worker's comp claim). The system may provide access at high volume to a large number of documents in a secure manner. The system may enable a stakeholder to locate and gain access to a specific desired portion of a record (for example, page 432 of a 500 page file containing hundreds of records) without loading and transferring an extremely large file.

In some embodiments, the method includes providing a first access portal for a first group and a second access portal for a second group, where the first group and the second group are different.

In some embodiments, the system may allow participants using the system to request or administer secure access by related persons based on the related person's role. For example, an injured worker may be able to initiate a request for and/or enable limited access for the injured worker's attorney. The injured worker's ability to enable access to the injured worker's attorney may be limited by the injured workers own limited access. The system may provide a window to accessing or providing information that is restricted based on the related person's role. For example, an injured worker's attorney may be only able to view, download, or upload documents for those claims where the attorney is representing the injured worker. The operation of the mechanism may vary depending on the type of stakeholder. For example, a large claims administrator may have one manner of enabling access by others (e.g., claims handling by numerous staff members at an insurer) and an individual injured worker may have a different manner of enabling access.

In some embodiments, a secure exchange portal system for independent medical review may include a receiving system implemented on one or more computer systems. The receiving system may be configured to implement a method as described herein.

In some embodiments, a non-transitory, computer-readable storage medium including program instructions stored thereon. The program instructions, when executed on one or more computers, may cause the one or more computers to implement a receiving system configured to implement a method as described herein.

FIG. 4 illustrates a display of a home page for a user of a secure document exchange portal. The home page allows for the user to make requests for information, case search, documents, or invoicing. Access to each category may be limited from one user to another by way of authorization mechanisms as described herein.

2. Automatic Document Classification Tool for Large Electronic Files.

Figure 5:
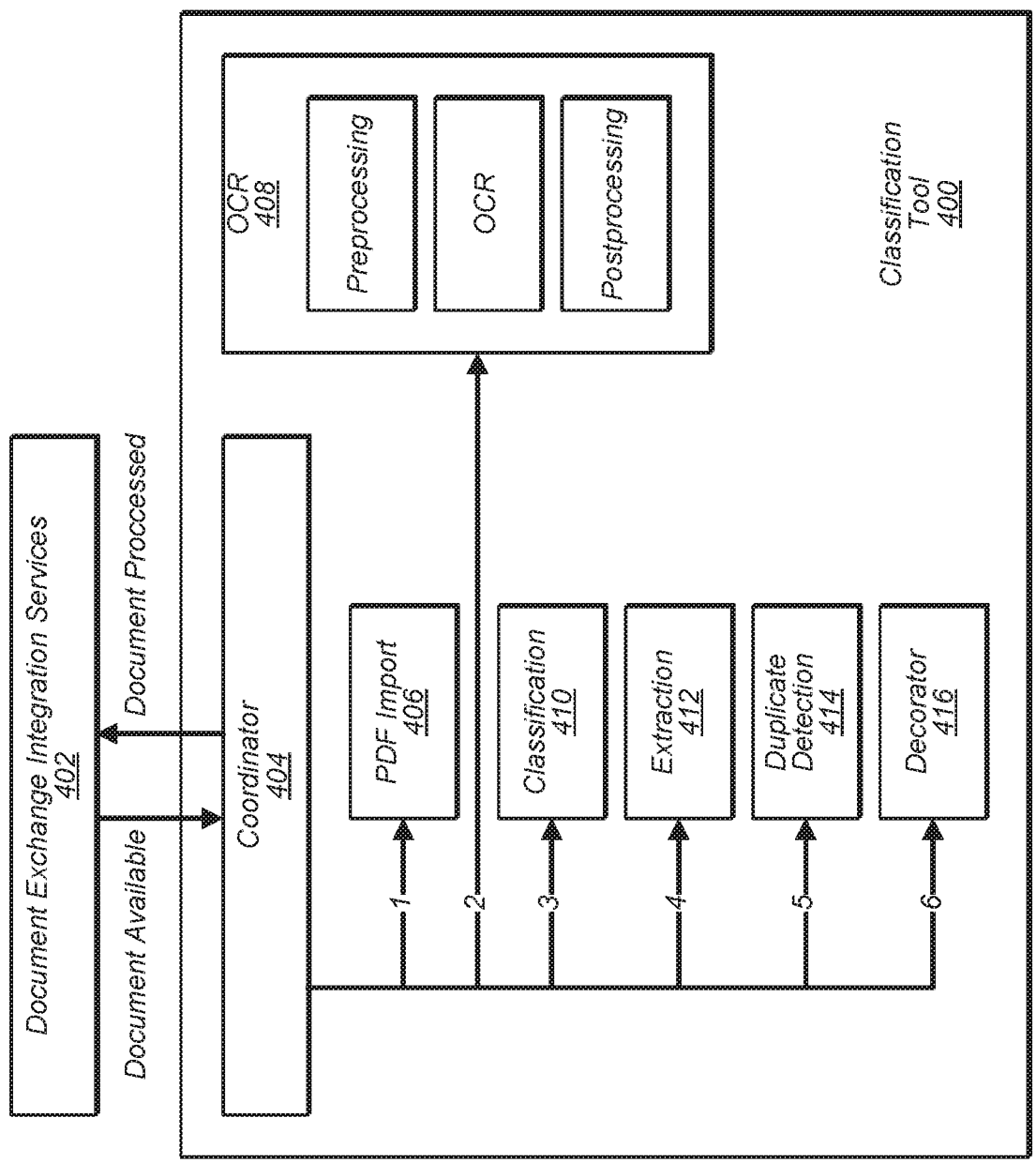
FIG. 5 illustrates a classification tool according to one embodiment.

FIG. 5 illustrates a classification tool according to one embodiment. Classification tool 400 may process documents received from document exchange integration services 402. Document exchange integration services may provide a notification that a document is available for classification. Coordinator 404 may receive each document and implement operations in classification tool 400. Processing may include PDF import 406, OCR 408, classification 410, extraction 412, duplicate detection 414, and insertion of bookmarks by decorator 416. In one embodiment, a classification tool includes an import tool, OCR, classification, date extraction, duplicate detection, decorator and document Q/A.

The duplicate detection tool may find duplicate information within a document or a case file. For example, a file may contain multiple copies of a particular progress report that were uploaded by different stakeholders at different times. Finding duplicates may involve searching the hash keys vs. comparing the text of each page. In one embodiment, duplicate detection leverages a Locally Sensitive Hash (LSH). The tool can also be used to find similar pages. With a 64-bit hash each bit represents approximately 1.56% of the page, so difference can be computed by the number of differing bits.

Information extraction tool supports extraction of attributes for downstream processing. In one embodiment, information extraction is used to extract service dates allowing downstream processes to provide a timeline of events.

Corrections to classification and extraction errors can be captured with a QA Tool prior to releasing documents to physicians. Corrections captured by the QA Tool may also be used to improve classification and extraction accuracy.

Figures 6A, 6B:
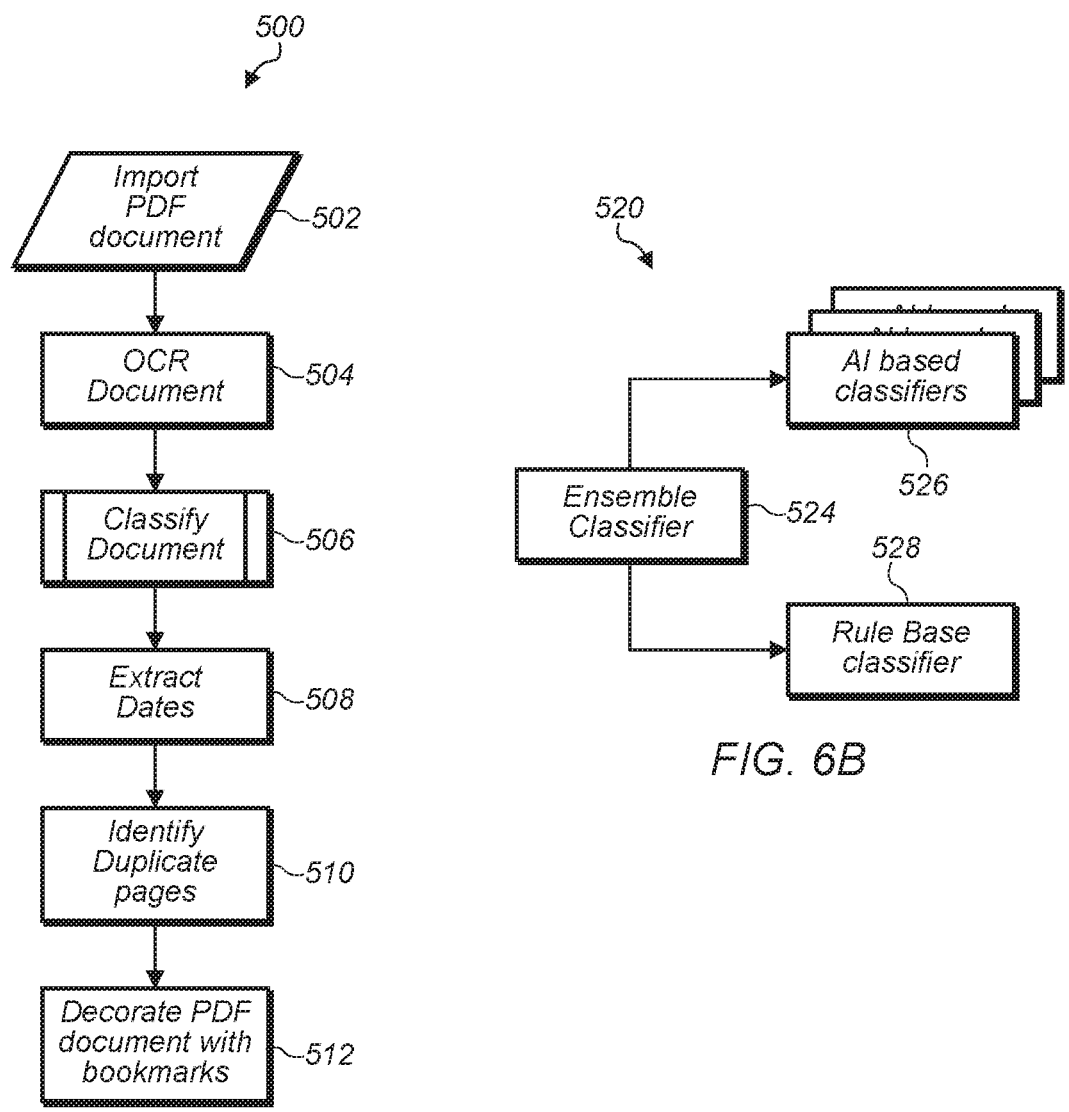
FIGS. 6A-B illustrate one embodiment of a flowchart illustrating a method of using rules for classifying information in a large electronic file.

FIG. 6A illustrates one embodiment of a flowchart illustrating a document classification flow (500). In some embodiments of the method, files are imported (502). The imported file may undergo OCR (504) to extract text from scanned pages. Documents within the imported file may be classified (506) using a classification tool. In some embodiments, the method may include extracting specific information and metadata from the imported documents. The specific information may include dates (e.g., such that the documents may be organized according to their creation and/or entry date) and other meta-data. The method may include identifying (510) duplicate information and specifically duplicate pages within the imported documents using a duplicate detection tool. The duplicate detection tool may find duplicate information within a document or a case file. For example, a file may contain multiple copies of a particular progress report that were uploaded by different stakeholders at different times. The method may include adding (512) bookmarks with a decorator tool. The bookmarks may provide quick access to identified information. The metadata from this pipeline may also be used by the case viewer to facilitate a case-level view.

FIG. 6B illustrates one embodiment of a flowchart illustrating an ensemble classifier tool (524). The ensemble classifier tool may be applied to identify specify information in the documents. The ensemble classifier tool may include different classifiers such as AI based classifiers (526) and rule base classifiers (528).

In some embodiments, the classification tool may classify a portion of the file as a particular type of document. Examples of document types into which portions of the file may be classified include: a request for authorization, a utilization review determination, or a physician's progress report. In some embodiments, the classification tool may function to reduce redundancies and/or irrelevant data within the file. For example, the classification tool may identify duplicate information (e.g., duplicate information may be submitted from multiple sources).

In some embodiments, the classifiers may include an ensemble approach that combines the predictions from multiple classifiers for a final prediction. The classification framework allows the configuration of different classifiers, such as AI based classifiers, and classifier proxies such as thresholding classifiers, weighting classifiers. The ensemble can use different mechanisms for a final prediction such as weighting.

The classification framework also includes tools to measure the accuracy of the classifiers and to retrain the classifiers as needed.

In some embodiments, the classifiers may include rules-based classifiers. In some cases, a rules-based classifier identifies phrases and associates them with specific labels. An example of a rule-based system is the domain-specific expert system that uses rules to make deductions or choices. For example, an expert system might help a doctor choose the correct diagnosis based on a cluster of symptoms. Rule-based systems may be used to perform lexical analysis to compile or interpret computer programs, or in natural language processing.

A rule-based system may include a rule base and an inference engine or semantic reasoner. A rule base may include a list of rules. An inference engine may infer information or take action based on the interaction between input data and the rule base.

In some embodiments, various other artificial intelligence classifiers, such as maximum entropy, may be used in addition to or instead of the rules-based classifiers. Maximum entropy may be referred to as multinomial logistic regression. Multinomial logistic regression is a classification method that generalizes logistic regression to multiclass problems, or a model that is used to predict the probabilities of the different possible outcomes of a categorically distributed dependent variable, given a set of independent variables. Multinomial logistic regression may be used when the dependent variable in question is nominal and for which there are more than two categories. Rule-based systems and maximum entropy systems may be used in combination with one another (e.g., comparing the scores from the results to determine the best result). In some embodiments, search tools may rely on visual or non-text indicators, such that images themselves are searchable (which may be useful considering the number of medical images which may associated with a case).

In some embodiments, based on the output of the classifiers, scores are computed for various portions of the file. For each portion, the best score may be determined and used as an outcome for a particular portion of the file. In some embodiments, the presence of certain phrases may be used to identify a portion of the file as a particular type of information, such as a physician's progress report.

In some embodiments, a method may include assigning at least one type of bookmark based upon the classification. Based on the classifications, the file is decorated with bookmarks that match the determined classifications. In some embodiments, dates or times are determined for some or all of the classified information. The document classifications, dates, bookmarks, and other information extracted or determined during classification may be sorted, arranged, and presented to a user (e.g., a physician reviewing the file) to facilitate the user's review of the file. In some embodiments, the user may be presented with a dashboard that allows the user to navigate through the bookmarks in a particular case, by document class type, date, and/or other user-selected criteria.

In some embodiments, classifying elements of information in a file includes refining the automated classification method based upon manual corrections of the classification method. In some embodiments, a quality assurance tool 620 is used to assess the output of the document classification tool 610. The quality assurance tool may be operated by a quality assurance (QA) reviewer 630 (e.g., a clerk or nurse) to review the classification output and assess the quality of the classification output.

In some embodiments, the QA reviewer 630 manually identifies any errors or omissions in the classification output (e.g., a document identified with the wrong document type identifier). The QA reviewer may use hot keys or similar mechanisms to quickly make additions or changes to the file. In cases where there are errors, the QA reviewer may fix errors. For example, the QA reviewer may make corrections, add a bookmark, remove a bookmark, and/or change a bookmark.

In some embodiments, results of the review may be used to automatically train the document classification tool. For example, the system may use the information from the QA review to automatically modify the classifier to more accurately identify or date information in future use of the classification tool.

In certain cases, the classification tool can assess graphical content in addition to, or in conjunction with, textual information in a file to classify portions of the file.

3. Case-Level Review Tool for Physicians.

Figure 7:
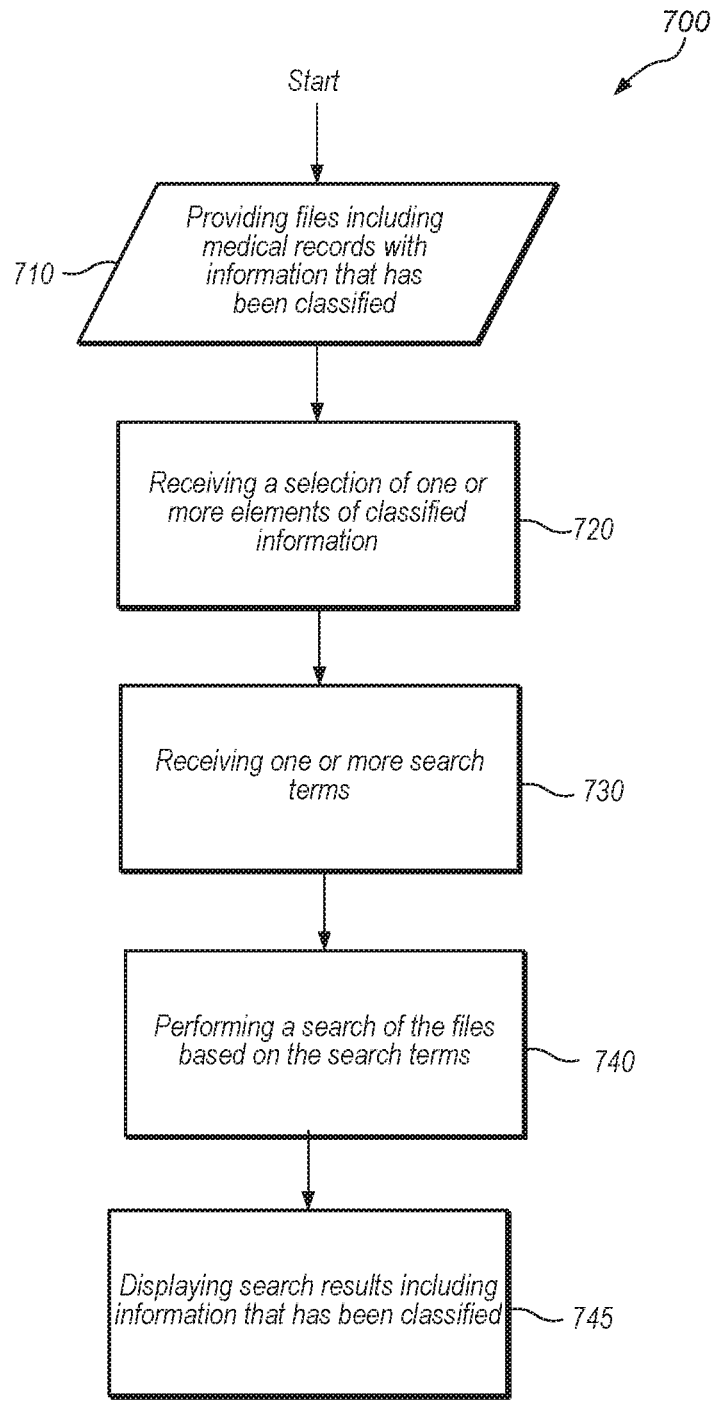
FIG. 7 is a flowchart illustrating a method of assisting physicians using a physician's search tool based on information that has been automatically classified.

FIG. 7 illustrates one embodiment of a flowchart illustrating a method (700) of assisting physicians using a physician's search tool 810 based on information that has been automatically classified. In some embodiments, the method may include providing (710) one or more files comprising scanned medical records. At least one of the files may include information classified as pre-defined information types. In some embodiments, the method may include receiving (720), from a physician user, a selection of one or more elements of classified information. One or more search terms may be received from the physician user (730). The physician search tool may perform one or more searches based on the search terms. (740). Results of the search, including elements of classified information, may be displayed to the physician user (745).

In some embodiments, the files include two or more files associated with the same medical claim. In some embodiments, the method may include searching the content of the files. In some embodiments, the method may include creating a summary of a content of the at least one of the files.

Figure 8:
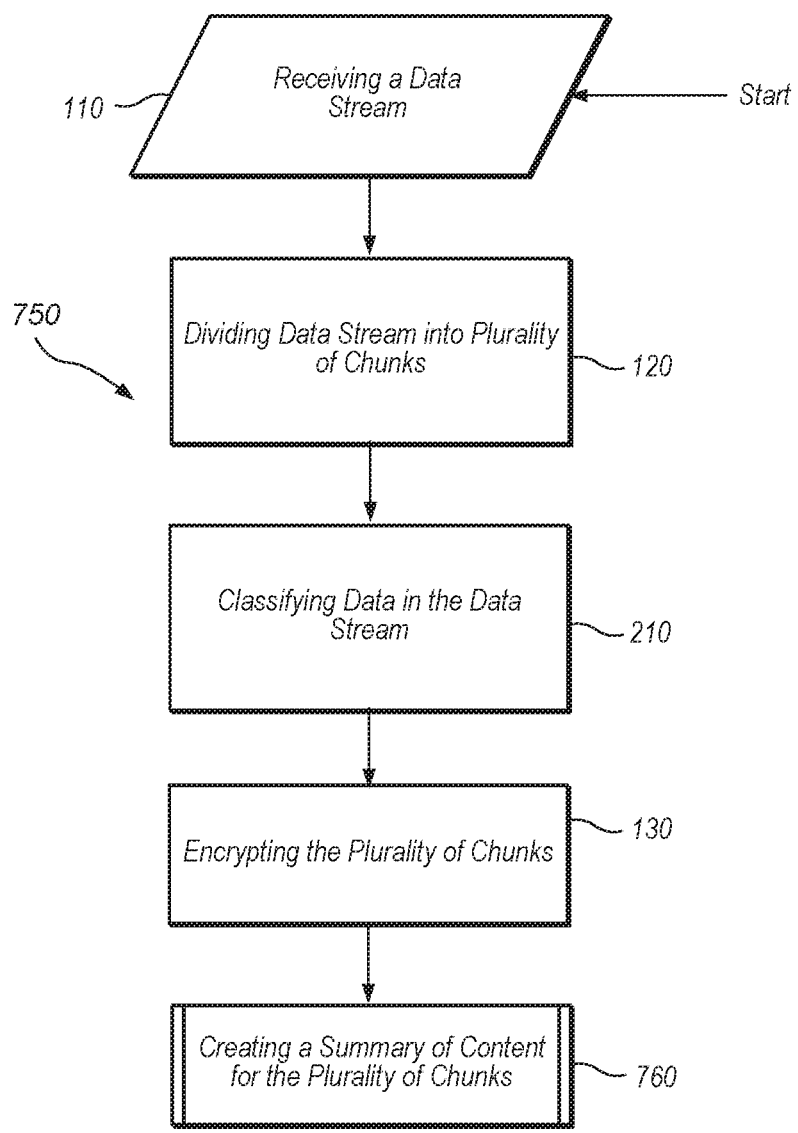
FIG. 8 is a flowchart illustrating a method of assisting physicians using a physician's search tool.
Figure 9:
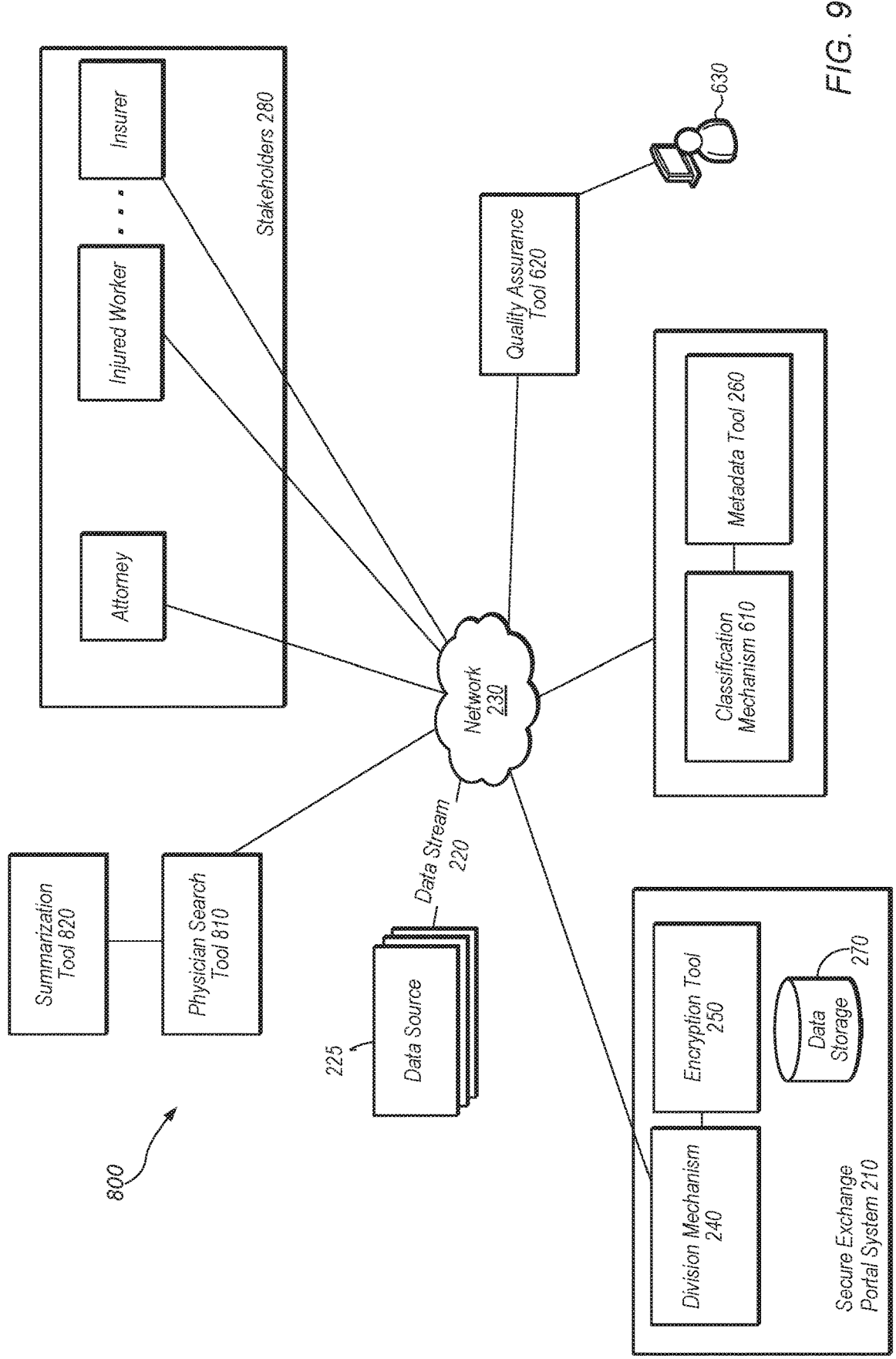
FIG. 9 illustrates one embodiment of a system including a physician's search tool.

FIGS. 8 and 9 illustrate one embodiment of a flowchart illustrating a method (750) and 800 of assisting physicians using a physician's search tool 810 based upon automatically classifying information using a secure exchange portal system 210 for independent medical review. In some embodiments, a method as described herein may include assisting physicians using a physician's search tool based upon automatically classifying information using a secure exchange portal system (e.g., for independent medical review). A review tool may enable a physician to review, search, and annotate large electronic files that contain all of the records for a case. As discussed herein, the file may include, for example, an image pdf file produced by scanning numerous paper documents. The case may be, for example, an independent medical review of a worker's compensation claim. In some embodiments, the method may be as described previously herein (e.g., receiving 110, dividing 120, encrypting 130, classifying 506, etc.) and the method further including creating (760) a summary of content for the plurality of chunks based upon the classification and/or the metadata using a summarization tool 820.

In some embodiments, a physician may view a case summary page for any of the cases assigned to the physician. The case summary page may include information on the contents of the electronic files(s) for the case. In some embodiments, the information may include a list of documents contained in the file(s). The document listing may be generated using an automatic document classification tool that has been applied to the contents of the files as described herein previously. In some embodiments, a document classification may be run on the text (e.g., OCR text) of one or more electronic files or scanned paper documents. In some embodiments, bookmarks may be added automatically corresponding to each document found based on the results of the classifier.

In some embodiments, the review tool allows for insertion of notes and case alerts by personnel that review the file prior to physician review (e.g., a nurse). For example, a nurse may add a case alert that includes a key fact about the case or that the case needs to be expedited. There may be different types of notes available for insertion. For example, notes may be color coded according to different predetermined uses and/or according to a user's preferences. In some embodiments, notes may include different priority levels (e.g., by color). For example, an inserted note including a specific priority level may automatically self-indicate (e.g., begin flashing, overlay all existing open windows, etc.) when a particular file the note is associated with is accessed.

In some embodiments, on a summary page for a case, the document listing may be arranged to facilitate quick and efficient review by the user (e.g., a physician). Examples of document types may include, but are not limited to: a request for authorization, a utilization review determination, or a physician's progress report. In some embodiments, the document listing may be arranged by type, then by document, then by date, then by page. Bookmarks, tags for notes, and/or case description may be displayed as desired by a user.

In some embodiments, a search mechanism in the review tool allows the user (e.g., physician) to search contents of the files. In some embodiments, the physician uses keywords and phrases to conduct the search. In some embodiments, the search mechanism employs fuzzy searching. Fuzzy searching allows the physician to search for contents using imprecise search criteria (where, for example, a precise search is not possible or may not find all of the relevant content). Approximate string matching (fuzzy string searching) may include finding strings that match a pattern approximately (rather than exactly). Approximate string matching may include finding approximate substring matches inside a given string and finding dictionary strings that match the pattern approximately. The closeness of a match may be measured, for example, in terms of the number of primitive operations necessary to convert the string into an exact match. In some embodiments, a search mechanism allows proximity searches. A proximity search may include a search for information where two or more separately matching term occurrences are within a specified distance. Distance may be measured by the number of intermediate words or characters. In some embodiments, some implementations of a proximity search may impose a constraint on the word order. In some embodiments, the search mechanism may account for aliases or synonyms (e.g., scientific name of a drug being associated with a brand name for the same drug). In some embodiments, search results may be in the form of line snippets including the search term, or highlighting applied directly onto the file image at the location of the search result.

In some embodiments, upon completion of the physician's review, the physician may write the physician's report directly to a backend system using the review tool. The review tool may include an editor that can be used by the physician to enter the report.

In some embodiments, using the review tool, a physician can access specific information or portions of the records for the case without downloading or unencrypting the entire contents of the electronic files for a case. This avoids the need for a physician to transfer and store large sensitive files on the physician's computing device. In some embodiments, the files for the case are indexed for content, such as particular drug names, medical conditions, or other relevant information.

FIG. 10 illustrates a case document management display for a physician search tool according to one embodiment.

FIG. 11 illustrates a display of physician search tool with a Bookmarks tab selected and bookmark links arranged by type.

Figure 12:
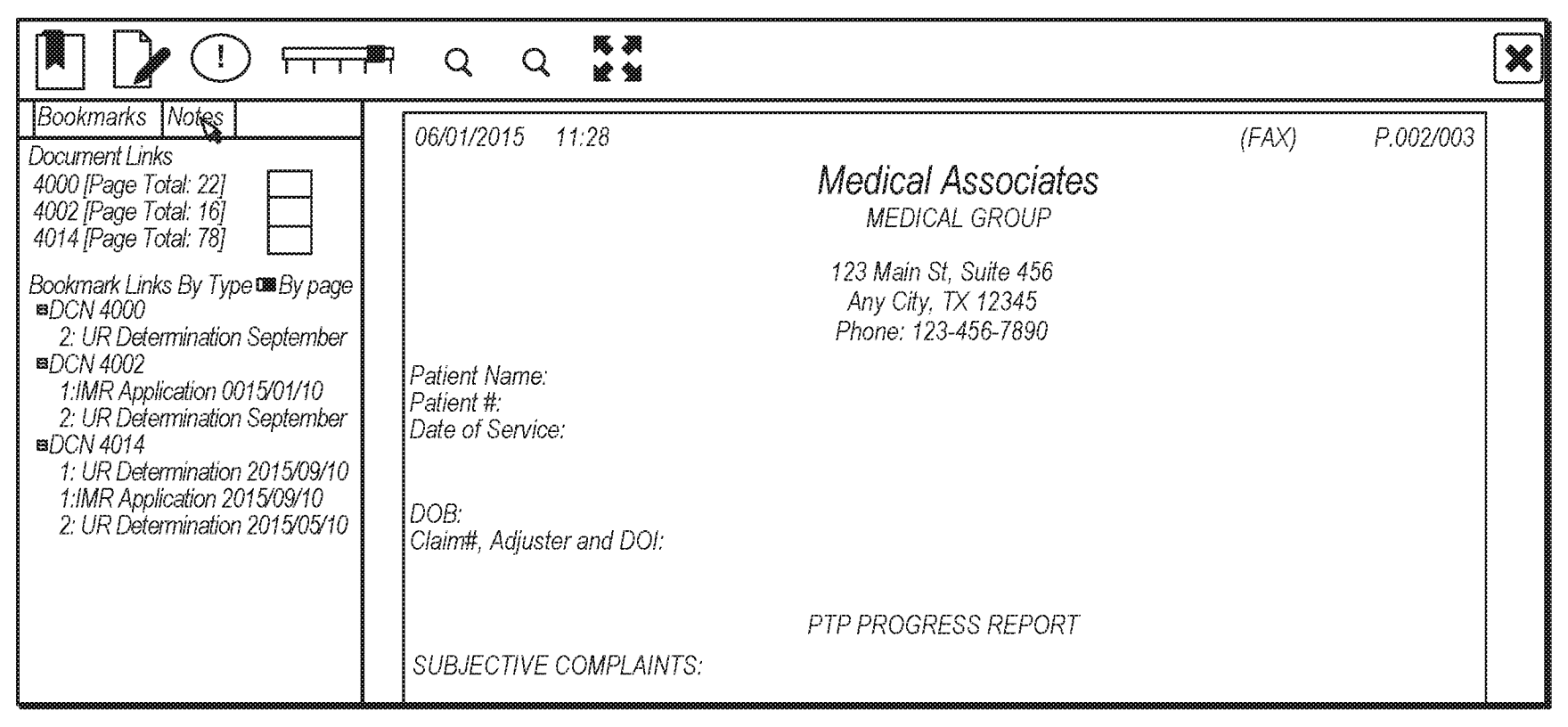

FIG. 12 illustrates a display of a physician search tool with a Bookmarks tab selected and bookmark links arranged by page.

Figure 13:
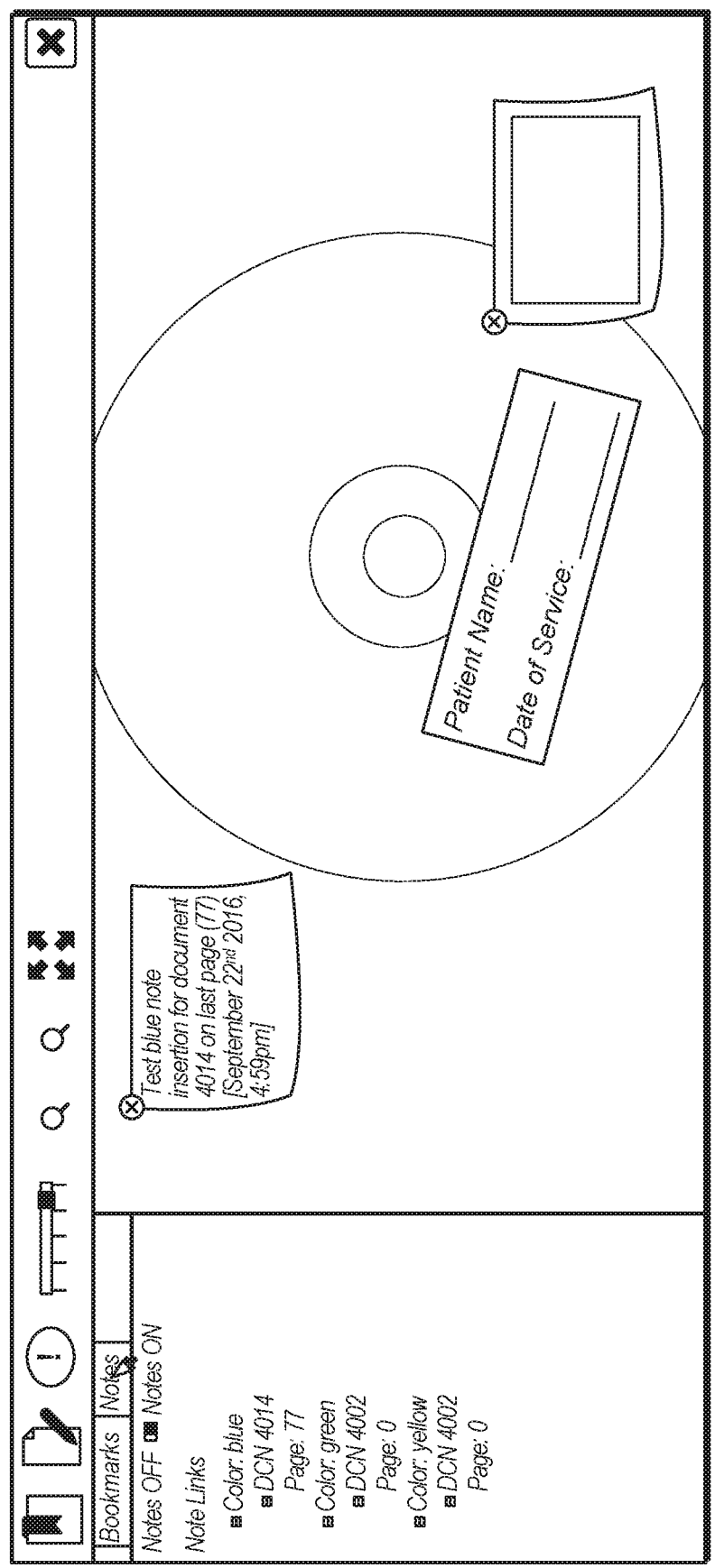
FIG. 13 illustrates a display of a physician search tool with a Notes tab selected and stick notes attached to a displayed document.

FIG. 13 illustrates a display of a physician search tool with a Notes tab selected and stick notes attached to a displayed document.

Figure 14:
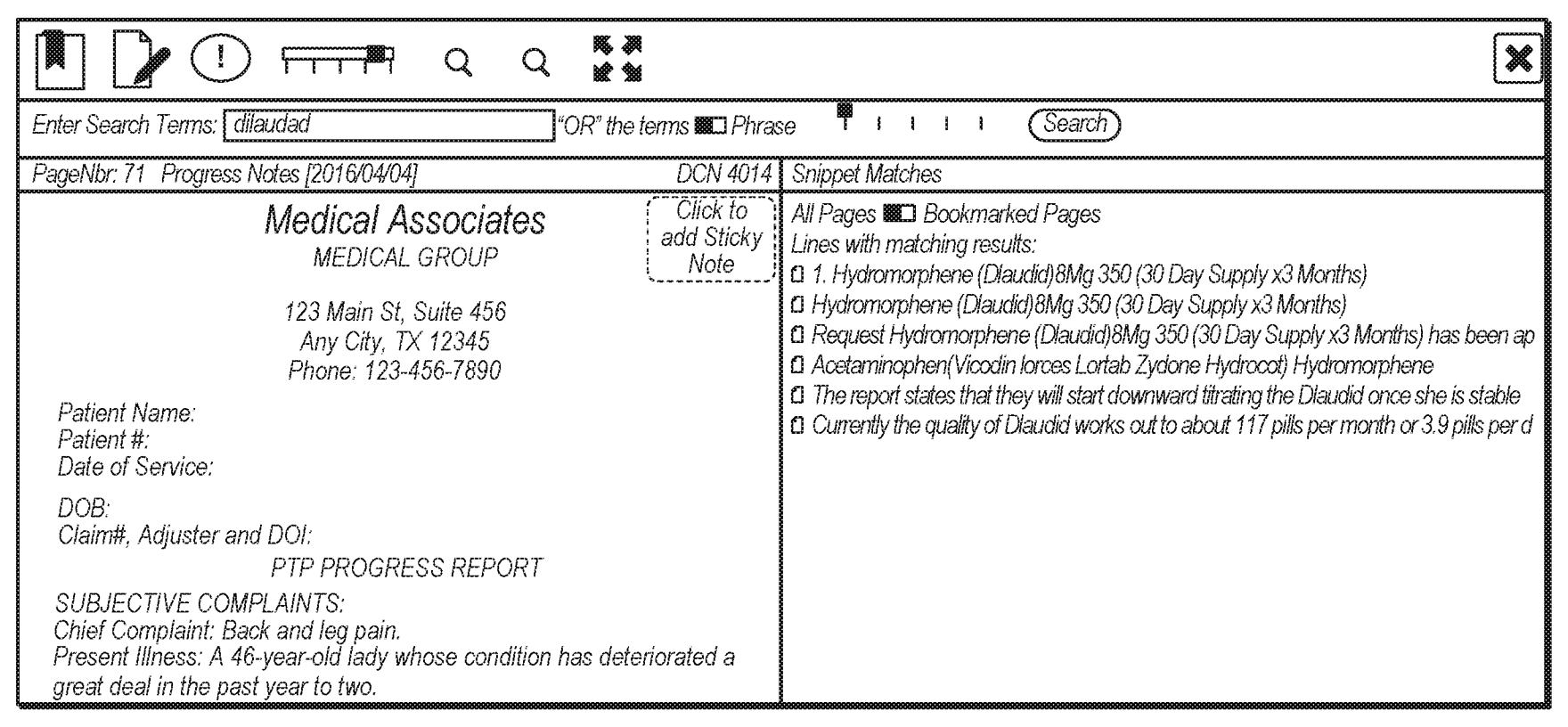

FIG. 14 illustrates a display of a physician search tool with line-by-line search results shown next to a document classified by the system as a Progress Note.

The memory medium may store a software program or programs operable to implement embodiments as described herein. The software program(s) may be implemented in various ways. A CPU executing code and data from the memory medium may include a means for creating and executing the software program or programs according to the embodiments described herein.

Although various embodiments above describe methods and processes used to process information in an independent medical review in a case under appeal in a worker's compensation case, systems and processes described herein (including the secure document exchange, classification, and search tools) may be used in other worker's compensation claims, medical claims, or other processes involving review of information contained in large files.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of managing a secure exchange portal system for medical review, comprising:
   receiving a data stream from at least a first source, wherein the data stream includes documents having data for a medical claim being evaluated under a medical review, and wherein the data stream includes at least two documents;
   dividing the received data stream into a plurality of chunks, wherein the chunks include sets of documents having the data for the medical claim being evaluated;
   individually encrypting at least two of the plurality of chunks, wherein individually encrypting each of the chunks includes generating one or more encryption keys for each chunk;
   creating metadata for the at least two documents, wherein the metadata includes data for the encryption keys, wherein creating the metadata includes creating a first set of metadata and a second set of metadata, the first set of metadata being used to restrict access to at least one of the chunks to a first group of users and the second set of metadata being used to restrict access to at least one of the chunks to a second group of users, wherein the first group of users is different from the second group of users, and wherein the first group of users accesses a specific portion of the at least one of the documents using the first set of metadata; and
   evaluating the medical claim based of the data for the medical claim in at least one of the plurality of chunks.

2. The method of claim 1, wherein the first source comprises a plurality of paper documents converted into an electronic file.

3. The method of claim 1, further comprising converting the data stream into a searchable format using character recognition.

4. The method of claim 1, wherein the metadata further includes coded medical identifiers for the sets of documents having the data for the medical claim being evaluated.

5. The method of claim 1, wherein the first group of users accesses the at least one of the plurality of chunks using a back-office system through an integration server.

6. The method of claim 1, wherein evaluating the medical claim includes administering a worker's compensation claim based on the at least one of the plurality of chunks.

7. The method of claim 1, wherein evaluating the medical claim includes resolving a worker's compensation claim based on the at least one of the plurality of chunks.

8. The method of claim 1, further comprising compressing the plurality of chunks.

9. The method of claim 1, further comprising providing a first access portal for the first group and a second access portal for the second group.

10. The method of claim 1, wherein the metadata comprises a block size and an initialization vector.

11. A secure exchange portal system for medical review, comprising:
   a receiving system implemented on one or more computer systems, wherein the receiving system receives a data stream from at least a first source, wherein the data stream includes documents having data for a medical claim being evaluated under a medical review, wherein the data stream includes at least two documents, and wherein the receiving system is configured to implement:
      dividing the received data stream into a plurality of chunks, wherein the chunks include sets of documents having the data for the medical claim being evaluated;
      individually encrypting at least two of the plurality of chunks, wherein individually encrypting each of the chunks includes generating one or more encryption keys for each chunk;
      creating metadata for the at least two document, wherein the metadata includes data for the encryption keys, wherein creating the metadata includes creating a first set of metadata and a second set of metadata, the first set of metadata being used to restrict access to at least one of the chunks to a first group of users and the second set of metadata being used to restrict access to at least one of the chunks to a second group of users, wherein the first group of users is different from the second group of users and wherein the first group of users accesses a specific portion of the at least one of the documents using the first set of metadata; and
      evaluating the medical claim based on the data for the medical claim in at least one of the plurality of chunks.

12. A non-transitory, computer-readable storage medium comprising program instructions stored thereon, wherein the program instructions, when executed on one or more computers, cause the one or more computers to implement a receiving system configured to:
   receiving a data stream from at least a first source, wherein the data stream includes documents having data for a medical claim being evaluated under an independent medical review, and wherein the data stream includes at least two documents;
   dividing the received data stream into a plurality of chunks, wherein the chunks include sets of documents having the data for the medical claim being evaluated;
   individually encrypting at least two of the plurality of chunks, wherein individually encrypting each of the chunks includes generating one or more encryption keys for each chunk;
   creating metadata for the at least two documents, wherein the metadata includes data for the encryption keys, wherein creating the metadata includes creating a first set of metadata and a second set of metadata, the first set of metadata begin used to restrict access to at least one of the chunks to a first group of users and the second set of metadata being used to restrict access to at least one of the chunks to a second group of users, wherein the first group of users is different from the second group of users, and wherein the first group of users accesses a specific portion of the at least one of the documents using the first set of metadata; and evaluating the medical claim based on the data for the medical claim in at least one of the plurality of chunks.

13. The system of claim 11, wherein the receiving system is further configured to implement evaluating the medical claim based on the data for the medical claim in at least one of the plurality of chunks.

14. The system of claim 11, wherein the receiving system is further configured to implement evaluating the medical claim includes resolving a worker's compensation claim based on the at least one of the plurality of chunks.

15. The system of claim 11, wherein the metadata further includes coded medical identifiers for the sets of documents having the data for the medical claim being evaluated.

16. The system of claim 11, wherein the receiving system is further configured to implement providing a first access portal for the first group and a second access portal for the second group.

17. The storage medium of claim 12, further comprising evaluating the medical claim based on the data for the medical claim in at least one of the plurality of chunks.

18. The storage medium of claim 12, further comprising evaluating the medical claim includes resolving a worker's compensation claim based on the at least one of the plurality of chunks.

19. The storage medium of claim 12, wherein the metadata further includes coded medical identifiers for the sets of documents having the data for the medical claim being evaluated.

20. The storage medium of claim 12, further comprising providing a first access portal for the first group and a second access portal for the second group.

* * * * *

UNITED STATES PATENT AND TRADEMARK OFFICE
CERTIFICATE OF CORRECTION

Page 1 of 1

PATENT NO. : 11,030,697 B2
APPLICATION NO. : 15/430131
DATED : June 8, 2021
INVENTOR(S) : Mark E. Erard et al.

It is certified that error appears in the above-identified patent and that said Letters Patent is hereby corrected as shown below:

In the Claims

Claim 12, Column 14, Line 67, after the word metadata, please delete "begin" and add --being--.

Signed and Sealed this
Third Day of August, 2021

Drew Hirshfeld
*Performing the Functions and Duties of the
Under Secretary of Commerce for Intellectual Property and
Director of the United States Patent and Trademark Office*